(12) United States Patent
Tattersall

(10) Patent No.: US 6,272,241 B1
(45) Date of Patent: Aug. 7, 2001

(54) PATTERN RECOGNITION

(75) Inventor: Graham D Tattersall, Friston (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 08/353,258

(22) Filed: Dec. 2, 1994

Related U.S. Application Data (63) Continuation of application No. 07/752,493, filed on Aug. 27, 1991, now abandoned.

(30) Foreign Application Priority Data

Mar. 22, 1989 (GB) ................................................ 8906558
Mar. 22, 1990 (WO) .................................. PCT/GB90/00443

(51) Int. Cl.$^7$ .................................................... G06K 9/00
(52) U.S. Cl. ............................................. 382/181; 382/159
(58) Field of Search ................................... 382/14, 15, 41, 382/10, 27, 155, 156, 157, 158, 159, 181, 276; 364/724.19, 724.12; 341/96, 97, 98

(56) References Cited

U.S. PATENT DOCUMENTS

| | | | |
|---|---|---|---|
| Re. 26,780 | * 2/1970 | Klinikowski | 341/96 |
| 2,632,058 | * 3/1953 | Gray . | |
| 2,755,459 | * 7/1956 | Carbrey | 341/97 |
| 3,200,339 | * 8/1965 | Gorlin | 341/96 |
| 3,754,238 | * 8/1973 | Oswald | 341/96 |
| 4,386,339 | * 5/1983 | Henry et al. | 340/347 |
| 4,435,823 | 3/1984 | Davis | 375/364 |
| 4,490,847 | * 12/1984 | Aleksander et al. | 382/10 |
| 4,694,451 | 9/1987 | Adams | 370/355 |
| 4,733,220 | * 3/1988 | Knierim | 341/96 |
| 4,782,459 | 11/1988 | Johnston | 364/724 |
| 4,797,941 | * 1/1989 | Lloyd et al. | 382/27 |
| 4,958,375 | * 9/1990 | Reilly et al. | 382/14 |
| 5,054,093 | * 10/1991 | Cooper et al. | 382/14 |

FOREIGN PATENT DOCUMENTS

| | | | |
|---|---|---|---|
| 0183389 | 6/1986 | (EP) | H04B/3/23 |
| 0300648 | 1/1989 | (EP) | G10L/5/06 |

OTHER PUBLICATIONS

Guide to Pattern Recognition using Random–access Memories Alexander & Stonham, Computers & Digital Techniques, Feb. 1979, pp. 29–40.
"A New Approach to Mainipulator Control: The Cerebellar Model Articulation Controller", Albus, Trans. ASME, Sep. 1975, pp. 220–227.
"Data Storage in the Cerebellar Model Articulation Controller," Albus, Transactions of the ASME, pp. 228–233.
"A Model of the Brain for Robot Control", part 2: A Neurological Model Albus,Byte, Jul. 1979, pp. 54–95.

* cited by examiner

*Primary Examiner*—Phuoc Tran
(74) *Attorney, Agent, or Firm*—Nixon & Vanderhye P.C.

(57) ABSTRACT

Input values are digitally represented and the bits used to address memories. A composite (e.g. the sum) of the memory outputs is formed, and update control is used during "learning" to modify the memory contents. The digital representation is formed by an encoder which encodes input values using a redundant code, which preferably has a Hamming distance to signal distance relationship which has a relatively steep initial slope and is closer to being monotonic than is the relationship for a simply binary code.

22 Claims, 7 Drawing Sheets

Fig. 2.

SAMPLED FUNCTION   INTERPOLATION KERNEL   CONTINUOUS FUNCTION

Fig. 3.

BAR CHART CODE

Fig. 4a

PATTERN SPACE

DECISION LINES CREATED
BY EACH CONNECTION

PATTERN RECOGNITION

This is a continuation of application Ser. No. 07/752,493, filed Aug. 27, 1991, now abandoned.

BACKGROUND OF THE INVENTION

1. Field of the Invention

The present invention is concerned with pattern recognition devices.

2. Related Art

Pattern recognition devices commonly receive, in digital form, an input pattern of bits which is then processed to produce a scalar value, or a number of such values, which are regarded as a vector. These may then be subjected to a thresholding operation to provide an output indicating the nature of an unknown pattern supplied to the device. Many such devices are learning devices, in that they are not constructed to recognize particular patterns but are, before use, supplied with training patterns, the output of the device being compared with information as to the nature of the pattern, or identifying a class to which it belongs, and the comparison result used as feedback to vary parameters stored within the device.

It is convenient to view such systems in terms of an input space and an output space. For example, one which receives a set of five scalar values and produces two scalar values may be considered as performing a mapping from a point in a five-dimensional input pattern space to a point in a two-dimensional output space.

One form of recognition device which has been proposed is the perceptron, which forms one or more weighted sums of a set of input values, the weighting factors being varied adaptively during the learning process. The main disadvantage of these is their inability to perform non-linear mappings from the input space to the output space, so that they cannot learn such apparently simple functions as the exclusive-or function. A solution to this problem is the multi-level percepton, where the output of a first layer of perceptrons supplies the input to a second layer; however, large amounts of training are required in order to learn quite simple non-linear mappings (i.e. convergence is slow), and this has made the application of multi-layer perceptions to real problems such as speech recognition very difficult.

Figure 1:
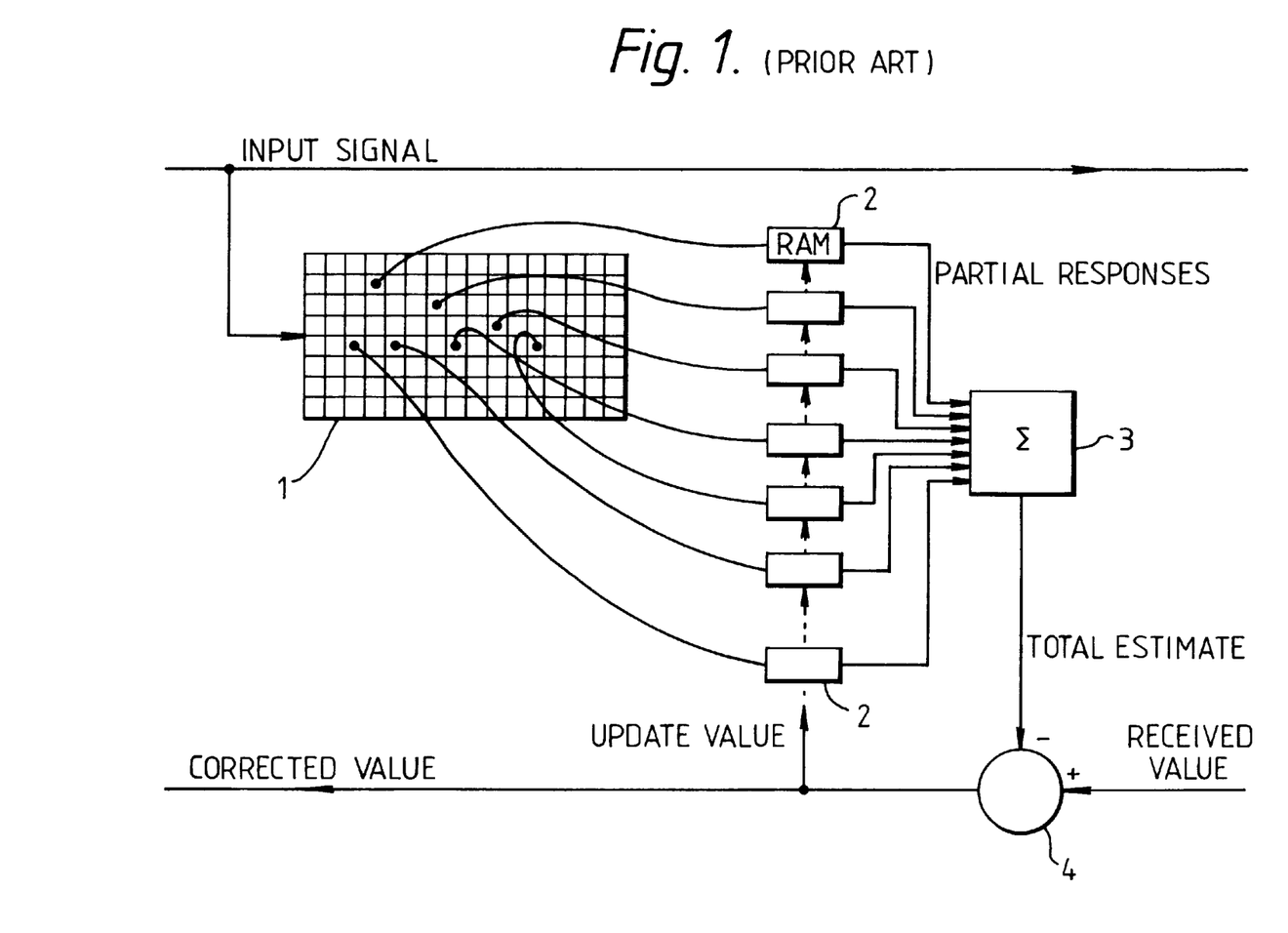
FIG. 1 as discussed above, shows a known form of pattern recognition device.

Another form of recognition device is described in our European patent application Ser. No. 0183389B, and U.S. Pat. No. 4,782,459. This, as shown in FIG. 1, has an input store 1 in which an input vector having sixteen elements of 8-bits each are stored. Groups ("n-tuples") of bits are taken to form n-bit addresses for each of a number of random access memories 2, and the contents of the memory locations thereby addressed are added in an adder 3 to form a scalar output. During training, this output is compared in a subtractor 4 with the desired output input thereto, and the difference used to control updating of the memory contents. One application of the arrangement shown is as an echo canceller for telecommunications applications where the store 1 is in the form of a shift register receiving successive digitally coded temporal samples of a transmitted signal, the object of the device being to learn a mapping which models the echo characteristics of a transmission path.

As will be explained in greater detail below, the ability of such a recognition device to generalize from examples given in training depends to some extent upon the form in which the input data within the store 1 is coded. It is of course conventional to employ binary coding to represent digital values of a signal, but (as discussed in "Guide to pattern and recognition using random-access memories"- Aleksander and Stonham, computers and digital techniques, February 1979, Vol 2 No 1, Page 36 "6.3 coding of physical data") this is not particularly suitable for this class of pattern recognition devices since signal values which are quite close in signal space are disproportionately far apart in Hamming distance. The authors there propose a Gray code (which employs the same number of bits as the binary code) to overcome this problem but note that this can lead to spurious results as widely differing input signal levels can be close in Hamming distance. They point out that the most suitable coding is a 1-in-N code (hereinafter referred to as a bar code), in which as many bits as there are signal levels are employed. This code suffers from neither of the above drawbacks. It is, however, very inefficient and can require a large amount of input space; for example, for input data having 256 levels (i.e. the typical output of an 8 bit digital to analog converter), a 256 bit wide input buffer is required—which is clearly impractical (the binary and Gray code versions require only 8 bits, of course).

SUMMARY OF THE INVENTION

The present invention therefore provides in a first aspect a pattern recognition apparatus comprising:

an input for receiving a set of digital values representing a pattern to be recognized;

a plurality of memories each having at least one address line for addressing locations therein, the address lines being connected to receive bits from a digital representation of the set of values; and means for producing a composite output dependent on data read from the addressed locations of the memories; wherein the apparatus includes means for encoding the input values to form the said digital representation employing a redundant code which has a normalized Hamming distance to normalized signal distance relationship having a mean slope greater than 1 for signal distances up to a predetermined level of at least 10% of the maximum signal distance.

Preferably the slope is at least 1.5, more preferably at least 2.

Another aspect of the present invention provides a pattern recognition apparatus comprising:

an input for receiving a set of digital values representing a pattern to be recognized;

a plurality of memories each having at least one address line for addressing locations therein, the address lines being connected to receive bits from a digital representation of the set of values; and means for producing a composite output dependent on data read from the addressed locations of the memories; wherein the apparatus includes means for encoding the input values to form the said digital representation using a code employing a number of bits which is:

i) greater than that which a binary code would require to represent an equal number of signal levels; and ii) less than that number of signal levels; and being selected to have a higher monotonicity (as herein defined) than would such a binary code, irrespective of the magnitudes of said values.

As will be discussed below, the first aspect of the invention provides a pattern recognizer which has similar properties to a bar code recognizer but is physically practical to construct. The second aspect of the invention, (which preferably employs a coding which as above uses a realistically small number of bits) provides a recognition device which can learn complex mapping functions (as discussed below) yet maintains the good generalization properties of the bar code type recognizer.

Also provided according to the invention is a method of training an n-tuple recognizer using redundant coding of the above types. Other preferred features are as recited in the claims.

BRIEF DESCRIPTION OF THE DRAWINGS

Some embodiments of the invention will now be described, by way of example, with reference to the accompanying drawings, in which.

DETAILED DESCRIPTION OF EXEMPLARY EMBODIMENTS

Figure 2:
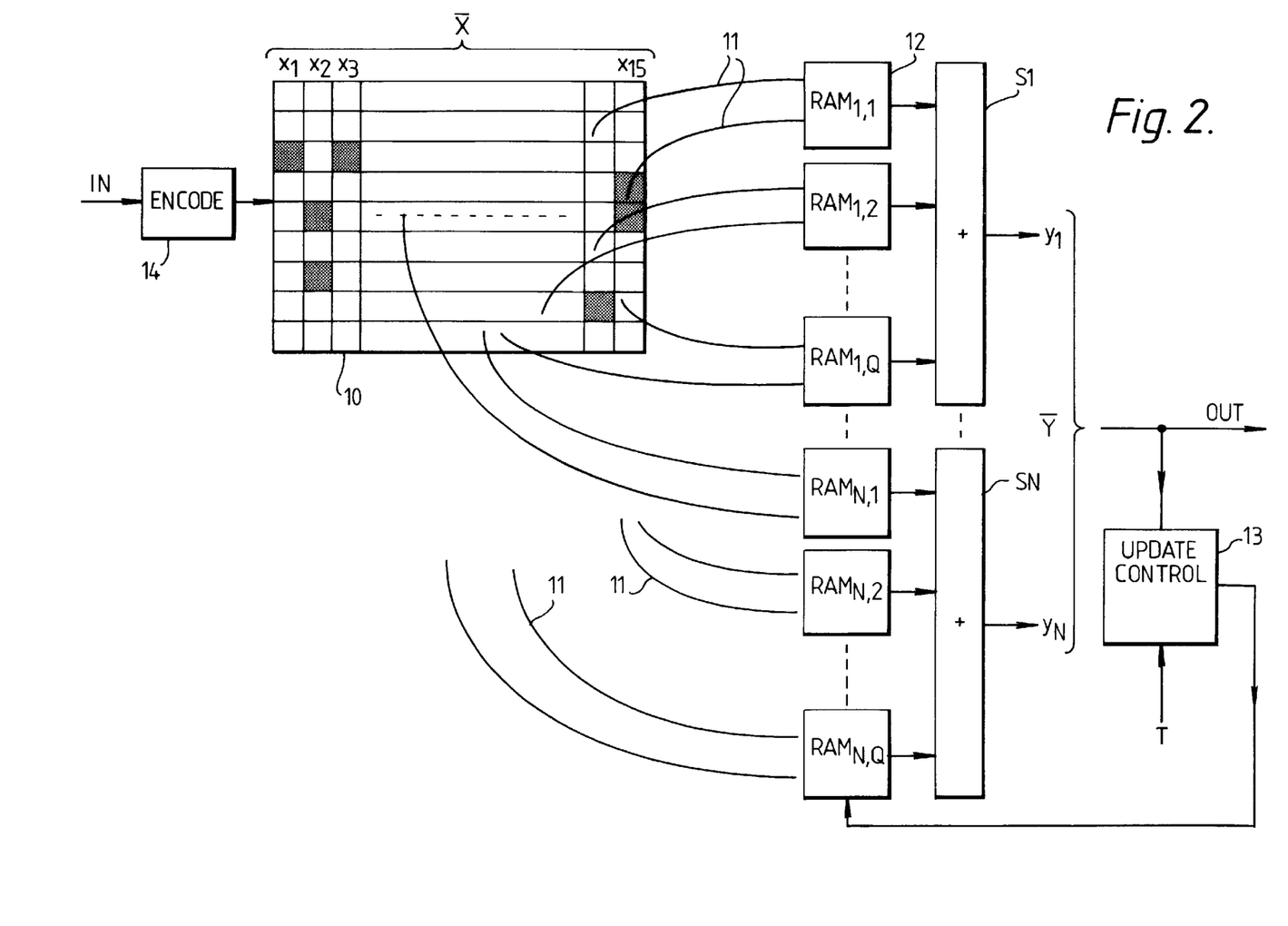
FIG. 2 shows generally a pattern recognition device according to the invention.

Referring to FIG. 2 there is shown a pattern recognition device having an input for receiving a time-varying signal in the form of digital samples. These are divided into frames of (for example) sixteen samples $x_1 \ldots x_{15}$ (or, in vector notation, X) and stored in a store 10. To avoid confusion, it may be stated that a frame may be regarded as a sixteen element vector (viz. a one-dimensional array or pattern of samples) representing a point in a notional 16-dimensional input space.

Note that the case of a one-dimensional array is by way of example; multi-dimensional arrays (e.g. for image recognition) are equally possible.

Although, in the example, the input is a one-dimensional array, it is convenient to view the store 10 as two-dimensional since it must accommodate a number of bits for each sample. N-tuple connection lines 11 are, as in FIG. 2, connected to the store to form address lines for several banks 12 of memories. The connections are distributed over the bits of the store—i.e. their assignment is uncorrelated with the x-y organization of the data. Preferably, the assignments are made at random. The memories of the first bank are designated $RAM_{1,1} \ldots RAM_{1,Q}$ and those of the $N^{th}$ bank $RAM_{N,1} \ldots RAM_{N,Q}$, there being Q memories in each bank. The outputs of the memories of a bank are added in a respective adder $S_1 \ldots S_N$ to form an output $y_1 \ldots y_N$ (which may be regarded as an output vector Y).

The system is trained by applying a vector X to its input. This causes a specific set of n-tuple addresses to be generated, which access corresponding contents in each of the memories. The summation of the output of each bank of memories produces the elements of the output vector Y. This vector is compared in a control unit 13 with a desired output or target vector T and the result used to update the contents of the memory locations $C_{ij}$ of those memory locations addressed by the n-tuple lines ($C_{ij}$ being the content of the addressed location within the $j^{th}$ memory of the $i^{th}$ bank).

Repeated applications of different training vectors allows the system to learn the required input-output mapping Y=f (X). It is important to notice that with appropriate choice of n-tuple order and number of memories per bank, the system can estimate the best function f(X) to fit a rather sparse training set. That is, it is not necessary to expose the machine to all possible input-output vector pairs because it is able to interpolate the required function between training points. This property will be discussed in more detail later.

Once trained, the device should respond to receipt of an unknown input vector X by producing the desired output vector Y.

It will be seen that one difference between the device shown in FIG. 2 and that of FIG. 1 is the provision of multiple banks to enable a multi-element output vector to be generated. In addition, however, the device includes an encoder 14 for determining the bits representative of the input samples which are to be entered into the store. Before discussing the form of this in detail, the question of interpolation will be introduced.

Figure 3:
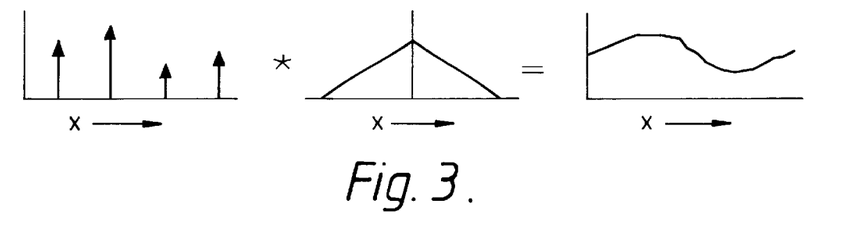
FIG. 3 illustrates the concept of an interpolation kernel.

A supervised learning machine is required to learn a mapping function Y=f(X); however, in a practical system, it is not generally possible to expose it to all possible input vectors X, and therefore satisfactory results will be obtained only if the system can interpolate between the training examples which it has been given, i.e. produce the desired response to an input vector which is not one of those used in training. This view of the training results as being a sampled version of the required continuous function leads one to regard the latter as the convolution of the sampled function, and an interpolation kernel. This is illustrated in FIG. 3 for the case of a one-dimensional function.

Figure 4A:
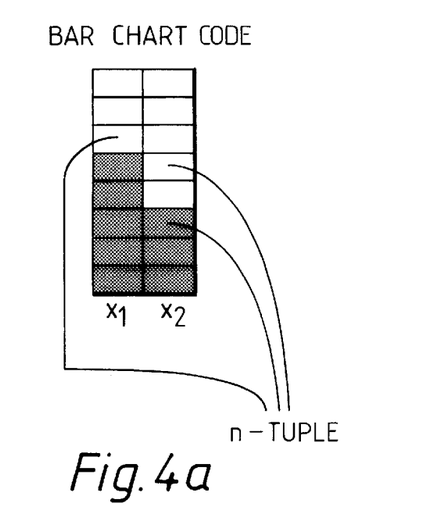
FIGS. 4a and 4b illustrate 1-in-N or bar coding.
Figure 4B:
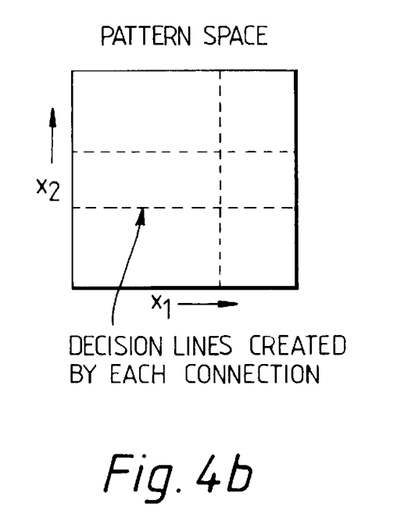

The form of interpolation kernel produced by the device of FIG. 2 depends strongly on the way in which the input vector X is coded. Consider a device for which the input vectors X have only two elements; this is easy to visualise as the input pattern space is two-dimensional. Suppose now (for the purposes of illustration) that each element of X is encoded in bar-chart form—i.e. the encoder 14 produces an output bit for every increment Of every dimension of X. A typical content of the store 10 for the case of an 8-level signal is shown in FIG. 4a for $x_1=5$ and $x_2=3$; and the corresponding pattern space in FIG. 4b. If three memory address lines are connected to the bits shown, then a change in the value in any of those bits causes a change in the address, and hence a change in the contribution of the associated memory to the output of the device. This effectively partitions the input space, as illustrated by the dotted lines in FIG. 4b; crossing a threshold line can cause a change in the output Y. Connection of further address lines causes smaller and smaller regions of the pattern space to be delineated.

Figure 5A:
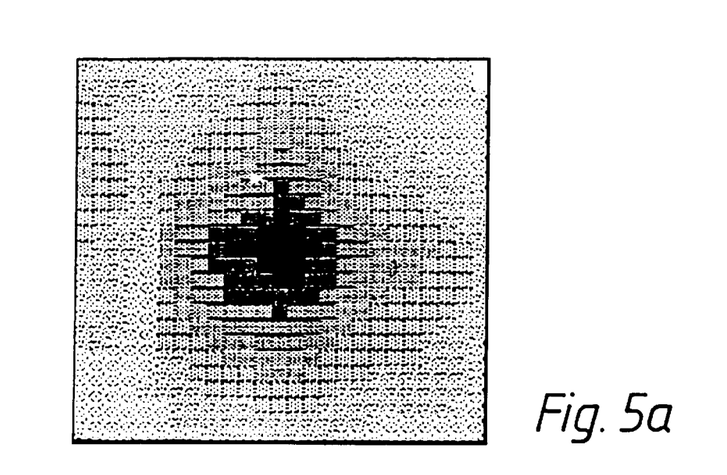
FIG. 5a illustrates the kernel function of the coding of FIG. 4 in the apparatus of FIG. 2.

For this simple two-dimensional case, the interpolation kernel can be plotted as the response of the device when it has been iteratively trained on a single input vector X. FIG. 5a shows the output $y_1$ of a device for all points in the pattern space, when trained on a single point in the centre. The device used W=24 quantization levels for each dimension, with 4-tuple (n=4) address connections disposed randomly over the input store. The width of the kernel is large for practical values of n and the number of dimensions in the pattern space, and therefore the complexity of the mapping function that can be learned is quite low. Bar-chart coding produces a large number of coded bits and therefore the size of the input store and the number of memories increases rapidly with the number of input dimensions, so that it is not satisfactory unless the number of input dimensions is low or the desired mapping function is very simple.

Figure 5B:
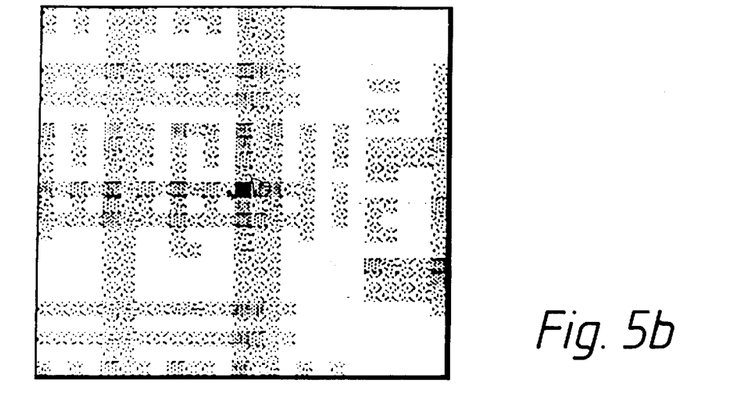
FIGS. 5b and 5c show the kernel functions correspondingly obtained employing simple binary coding and Gray coding respectively.
Figure 5C:
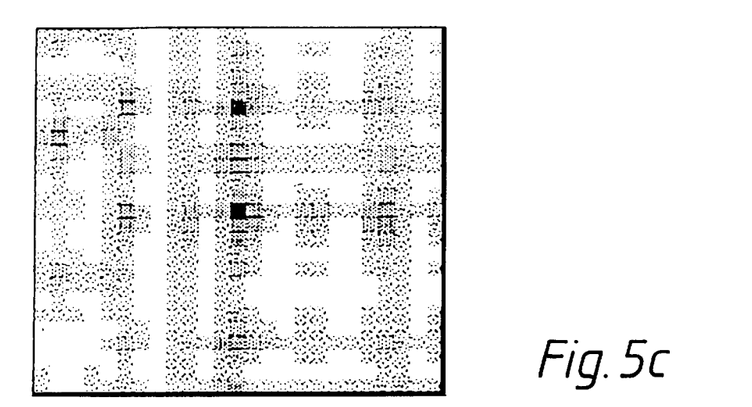

FIGS. 5b and 5c similarly show the interpolation kernel for the case where X is encoded in 5-bit simple binary and a Gray code respectively. The irregularity of the kernel is evident, though the centre of the kernel is much narrower than the bar-chart case.

The output from the device is, as one moves within the pattern space, influenced by the number of memories which are still receiving the original address produced by the training pattern. Loosely speaking, the probability of the n-tuple address changing value is proportional to the Hamming distance between the current input vector and the original training vector. It is believed that bar-chart coding gives a regular interpolation kernel because the relationship between signal distance (i.e. the difference between the actual values represented) and the Hamming distance between the corresponding encoded values is monotonic, whereas this is not so for simple binary (see FIG. 5b), or Gray code, although the latter is better than the former in that the Hamming distance changes only by 1 for every unit change in input value.

Perfect monotonicity in the relationship between Hamming and signal distance can be obtained only by the use of highly redundant codes (such as bar-chart coding) having one bit for each signal level represented. The encoder 14 aims to provide an improved interpolation kernel by encoding the input values using a redundant code which is, however, shorter than with the bar code.

Typically, the encoder is a ROM device, to the address lines of which the input signal bits are applied and from the data lines of which the codeword, stored at the address corresponding to that combination of input bits, may be read.

One simple way of doing this is to use a code which represents each input value, by the concatenation of several shifted versions of a Gray code, thereby causing some averaging of the irregularities. One possible composite code is set out below in Table 1.

TABLE 1

| SIG | CODE |
| --- | --- |
| 0 | 000000010011 |
| 1 | 000100110010 |
| 2 | 001100100111 |
| 3 | 001001100111 |
| 4 | 011001110101 |
| 5 | 011101010100 |
| 6 | 010101001100 |
| 7 | 010011001101 |
| 8 | 110011011111 |
| 9 | 110111111110 |
| 10 | 111111101010 |
| 11 | 111010101011 |
| 12 | 101010111001 |
| 13 | 101110011000 |

TABLE 1-continued

| SIG | CODE |
| --- | --- |
| 14 | 100110000000 |
| 15 | 100000000001 |

Figure 5D:
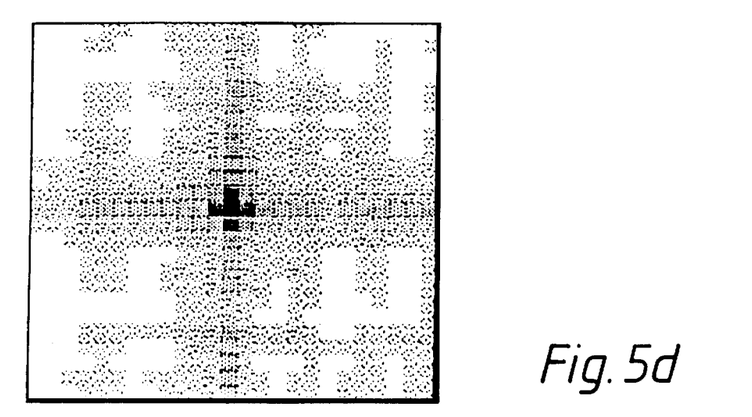
FIG. 5d illustrates an example of a kernel obtained employing a code according to the present invention.

The kneel function obtained using this code for the two-elements vector case is shown, in the same format as previously, in FIG. 5d.

It is believed that the reason that the use of bar chart coding results in a large kernel width is that, in that code, which (assuming linear steps between signal levels) has a linear relationship between Hamming distance and signal distance, the slope of the relationship is relatively low. In the binary code, on the other hand, the slope is relatively steep and the kernel width is small.

Suppose we define a normalized Hamming distance as $d'_h = d_h/d_{hmax}$ where $d_h$ is the actual Hamming distance and $d_{hmax}$ is the maximum Hamming distance for the code under consideration (i.e. the number of bits in the code) and the normalized signal distance as $d'_s = d_s/d_{smax}$ where $q_s$ is the signal distance and $d_{smax}$ is the maximum signal distance for that code. For a 16-level (linear) system the maximum signal distance is 15: however, for purposes of comparison it may be preferable to assume the maximum to be 16 (i.e. the number of levels).

Thus the mean slope (as opposed to the instantaneous slope) at any point is $d'_h/d'_s$. It follows from the above that the slope, for small signal levels (e.g. up to 10%, or preferably 15% or even 20 or 25% of the maximum signal distance) is in excess of unity, thereby representing an improvement over the bar-chart case.

In general, the Hamming distance (and hence slope) is not a unique function of signal distance in that it depends on which signal level one starts from. The above criterion may be taken to indicate that the slope obtained by taking the average of the mean slopes of all possible starting points (in both directions of signal distance) is greater than unity; more preferably, however, the mean slope for each starting point is greater than unity.

It is also postulated that the 'noise' remote from the centre of the kernel plots shown in FIGS. 5a to 5d is a result of the non-monotonicity of the Hamming distance signal relationship. It is thus preferable to use codes having a high monotonicity.

Figure 6:
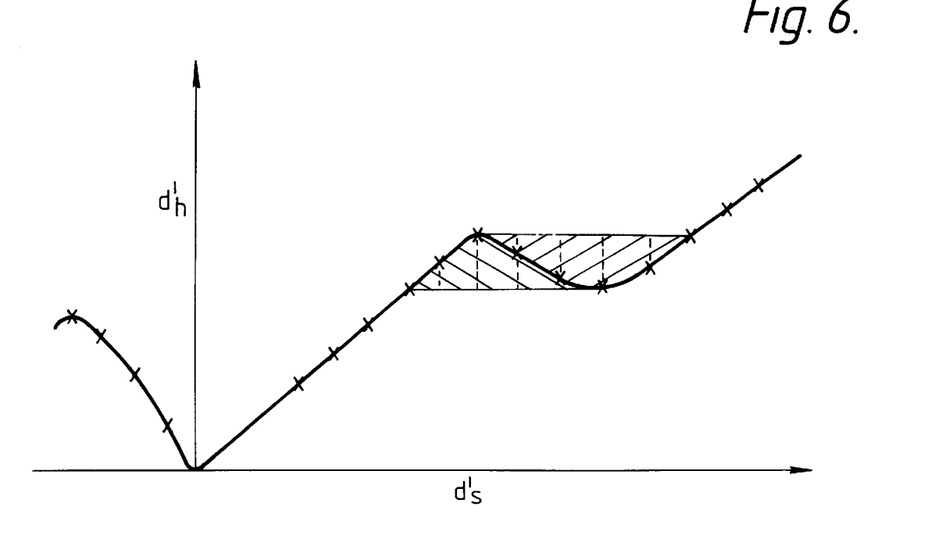
FIG. 6 illustrates the concept of "badness" employing a first measure.

Before considering this point, we will consider possible ways in which departure from monotonicity can be measured. FIG. 6 shows a hypothetical graph of Hamming distance versus signal distance starting from some arbitrary signal level. Any point on the plot which has a normalized Hamming distance less than its previous maximum is indicative of a departure from monotonicity, and one possible measure of badness would be the sum of these departures, shown by the dotted lines in FIG. 6. One also takes into account signal levels lower than the starting level, as indicated by the left hand half of the graph. The average of these sums taken over all starting points, is referred to here as "Badness 2". This is similar to considering the hatched area in FIG. 6 )which may be a viable alternative measure).

Alternatively, one could sum the departures from the previous minimum, proceeding in the negative direction (see chain-dot lines within the cross-hatched area in FIG. 6)—or the mean of this and Badness 2.

Figure 7:
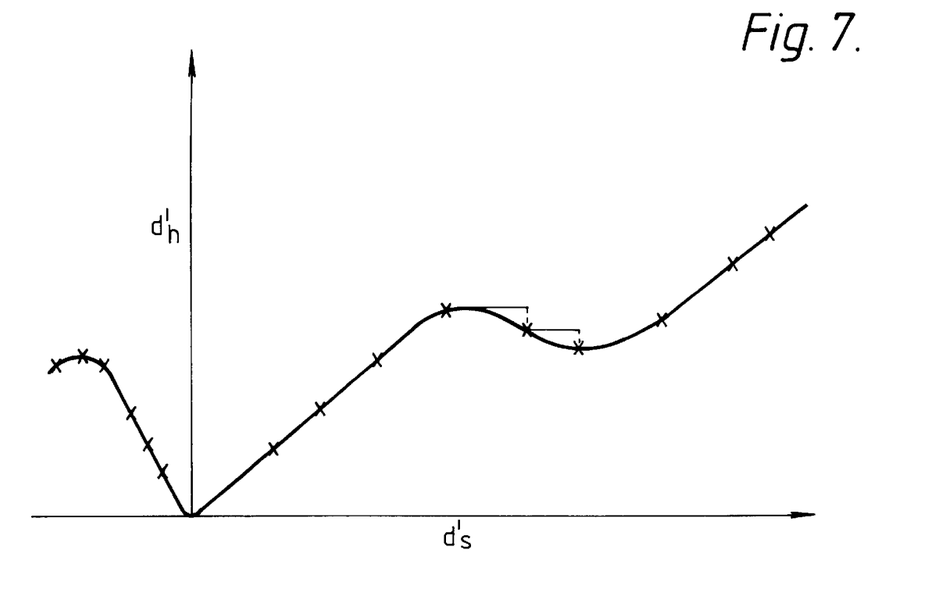
FIG. 7 illustrates a different measure of badness.

Another, similar, approach would be to take the sum (Badness 1) of the differences from the immediately preceding point if the latter is higher—i.e. the distances shown dotted in FIG. 7. The possibility of upper and lower measures does not arise in this case, since the two would always give the same value.

A further option is to weight the significance of these departures (on the basis that a 'kink' of given absolute size may be more significant at low distances than at high ones) by dividing each difference by she signal distance, before summations, thereby forming a "weighted badness."

To summarize the above, the badness measures may be defined mathematically as $$\text{Badness } 1 = \sum_{j=0}^{dsmax} \left\{ \sum_{i=j+1}^{dsmax} \langle d'_h(i-1,j) - d_h(i,j) \rangle + \sum_{i=j-1}^{0} \langle d'_h(i+1,j) - d'_h(i,j) \rangle 0 \right\}$$

$$\text{Weighted Badness } 1 = \sum_{j=0}^{dsmax} \left\{ \sum_{i=j+1}^{dsmax} \frac{\langle d'_h(i-1,j) - d'_h(1,j) \rangle}{i-j} + \sum_{i=j-1}^{0} \frac{\langle d'_h(i+1,j) - d'_h(i,j) \rangle}{j-i} \right\}$$

$$\text{Badness } 2 = \sum_{j=0}^{dsmax} \left\{ \sum_{i=j+1}^{dsmax} \langle \hat{d}'_h(i,j) - d'_h(i,j) \rangle + \sum_{i=j-1}^{0} \langle \hat{d}'_h(i,j) - d'_h(i,j) \rangle \right\}$$

$$\text{Weighted Badness } 2 = \sum_{j=0}^{dsmax} \left\{ \sum_{i=j+1}^{dsmax} \left\langle \frac{\hat{d}'_h(i,j) - d'_h(i,j)}{i-j} \right\rangle + \sum_{i=j-1}^{0} \left\langle \frac{\hat{d}'_h(i,j) - d'_h(i,j)}{i-j} \right\rangle \right\}$$

Where $d_h'(i,j)$ is the normalized Hamming distance between the codes representing signal levels i and j; $\hat{d}_h'(i,j)$ is the maximum normalized Hamming distance between the code j and any code prior (in the direction of summation) to code j; dsmax is the maximum signal distance (equal to the number of signal levels minus one); and the triangular brackets indicate that negative values are taken to be zero (i.e. $\langle x \rangle = 0$ for $x \leq 0$).

Loosely speaking, monotonicity here has its usual meaning. Where, in the following, exact values are quoted, we define monotonicity as being the reciprocal of the badness.

The following table indicates Badness 1 and Badness 2 figures for a number of 16-level codes. These figures are not normalized, but those having more than four bits are scaled to four bits.

TABLE 2

|  | B1 | B2 |
| --- | --- | --- |
| Four-bit binary | 3.125 | 5.6875 |
| Four-bit Gray | 2.75 | 5.1875 |
| Eight-bit Concatenated Gray (odd shift) | 0.875 | 2.469 |
| Seven-bit Lloyd no. 1 | 1.107 | 1.750 |
| Twelve-bit Concatenated Gray (1, 3) | 1.2085 | 2.5835 |
| Twelve-bit Concatenated Gray (+1, +7) | 1.1666 | 2.479 |

Note that the results for concatenated Gray codes depend on the shift(s) used. For the 8-bit code, the results obtained with an odd shift are significantly better than with an even shift.

These figures show that 4-bit Gray code has a better monotonicity than binary. The 12-bit concatenated Gray code (with shifts of (+1,+7)—which were found to give the highest monotonicity figure for that code) is significantly better, though not as good as the 8-bit concatenated Gray code. The 7-bit Lloyd code was designed (manually) to achieve a good monotonicity, discarding the cyclic property of the Gray code which is not needed for present purposes. It is slightly better or slightly worse than the 8-bit concatenated Gray code, according to which measure one considers. Note that this code is entirely monotonic (with a linear Hamming/signal distance relationship) for signal distances (from any starting value) up to 3 (i.e. 20% of the maximum signal distance of 15). With a small modification (1111011 for signal level 12) this limit is increased to 4.

The codes are set out below (Table 3).

TABLE 3

Figure 8A:
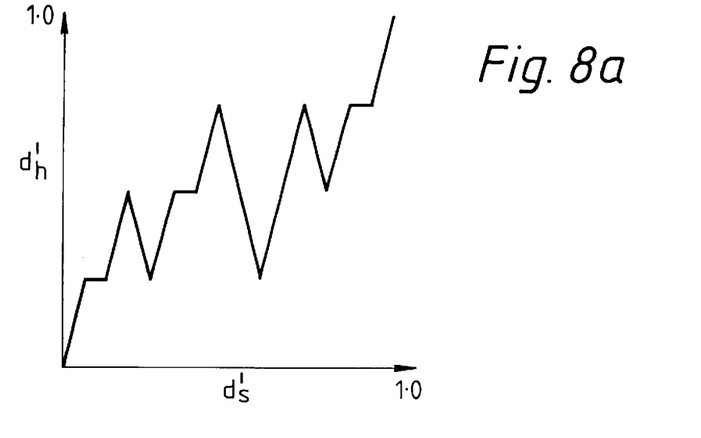
FIGS. 8a and 8b illustrate Hamming distance versus signal distance plots for binary and Gray codes, respectively.
Figure 8B:
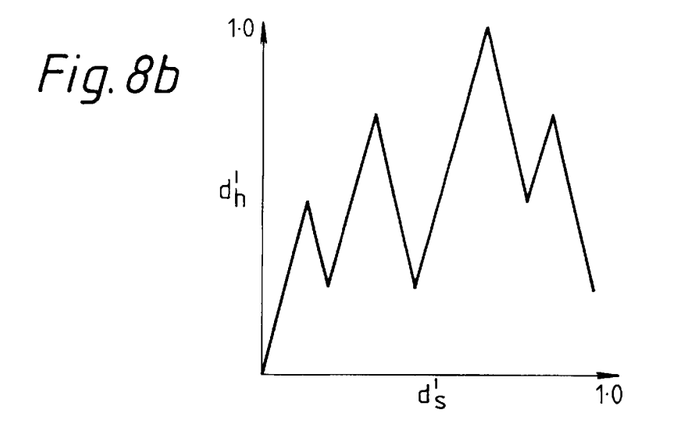

| BINARY 4-BIT(FIG. 8a) | | GRAY(FIG. 8b) | |
| --- | --- | --- | --- |
| SIG | CODE | SIG | CODE |
| 0 | 0000 | 0 | 0000 |
| 1 | 0001 | 1 | 0001 |
| 2 | 0010 | 2 | 0011 |
| 3 | 0011 | 3 | 0010 |
| 4 | 0100 | 4 | 0110 |
| 5 | 0101 | 5 | 0111 |
| 6 | 0110 | 6 | 0101 |
| 7 | 0111 | 7 | 0100 |
| 8 | 1000 | 8 | 1100 |
| 9 | 1001 | 9 | 1101 |
| 10 | 1010 | 10 | 1111 |
| 11 | 1011 | 11 | 1110 |
| 12 | 1100 | 12 | 1010 |
| 13 | 1101 | 13 | 1011 |
| 14 | 1110 | 14 | 1001 |
| 15 | 1111 | 15 | 1000 |

Figure 8C:
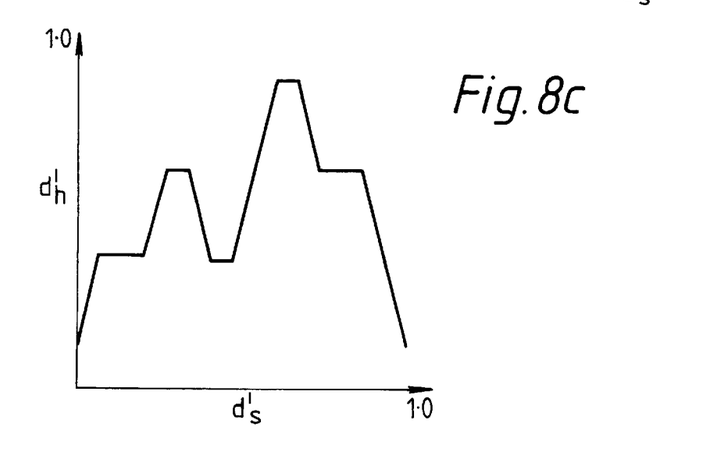
FIGS. 8c and 8d illustrate corresponding plots for embodiments of the invention.
Figure 8D:
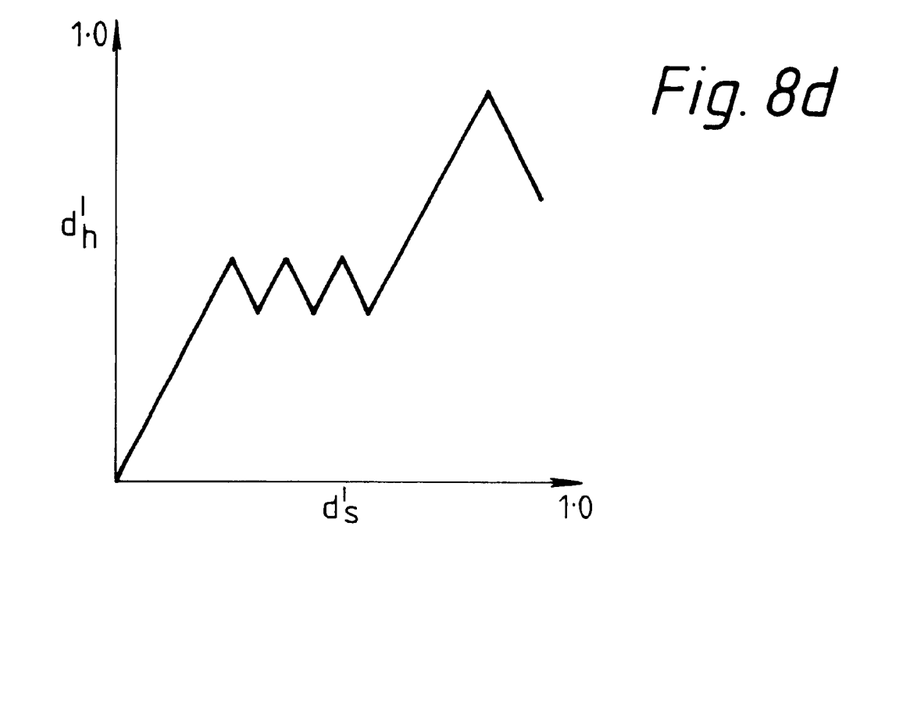

| CONCATENATED (8 BIT) GRAY (FIG. 8c) | | LLOYD (FIG. 8d) | |
| --- | --- | --- | --- |
| SIG | CODE | SIG | CODE |
| 0 | 00000001 | 0 | 0000000 |
| 1 | 00010011 | 1 | 0000001 |
| 2 | 00110010 | 2 | 0000011 |
| 3 | 00100110 | 3 | 0000111 |
| 4 | 01100111 | 4 | 0001111 |
| 5 | 01110101 | 5 | 0001110 |
| 6 | 01010100 | 6 | 0011110 |
| 7 | 01001100 | 7 | 0011100 |
| 8 | 11001101 | 8 | 0111100 |
| 9 | 11011111 | 9 | 0111000 |
| 10 | 11111110 | 10 | 1111000 |
| 11 | 11101010 | 11 | 1111001 |
| 12 | 10101011 | 12 | 1111101 |
| 13 | 10111001 | 13 | 1111111 |
| 14 | 10011000 | 14 | 1110111 |
| 15 | 10000000 | 15 | 1110110 |

Figure 8E:
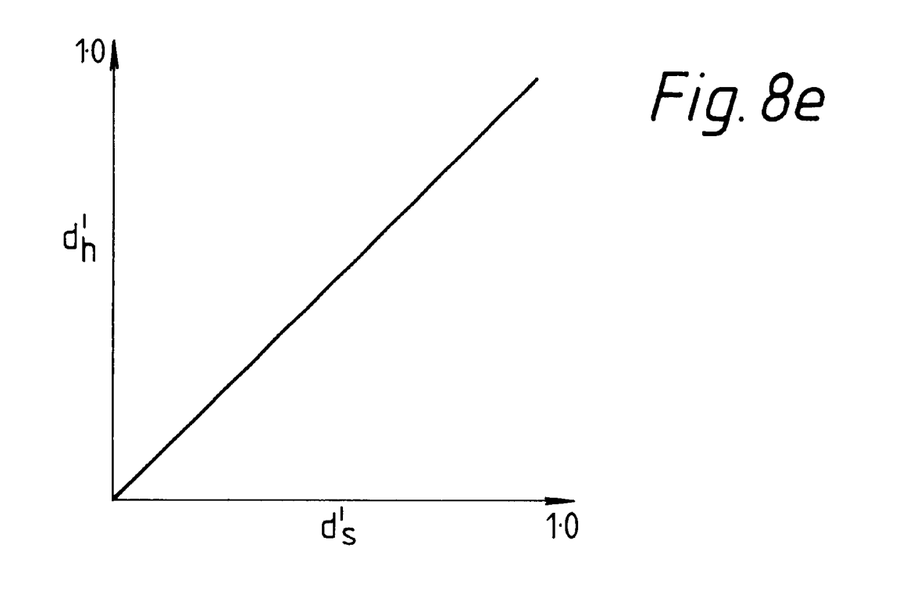
FIG. 8e illustrates a corresponding plot for a bar code

FIGS. 8a–8d codes as (normalized) Hamming distance against Signal distance (from 0) plots. The bar code is also illustrated for comparison (FIG. 8e)

In general, the monotonicity of the code used is greater than that of the binary code representing the same number of signal levels; preferably, it is at least 1.5 times that figure preferably it is at least 2.0 times that figure.

It is expected that a concatenation of shifted binary codes will have poor monotonicity and that the codes used preferably exceed to the desired extent that of such a code.

The means adopted by the control unit—for adaptively adjusting the contents of the memories—during the learning phase will now be discussed.

The adaptation by the RAM memory contents to develop the required mapping function may be done using a gradient descent procedure. It can be shown that the gradient is very easily calculated and that the error surface for the system is quadratic thereby indicating that convergence is always possible.

Each memory in the system is addressed by an n-tuple address whose value depends on the input vector X. Thus, the output of each memory in the system depends in some complex way on X, and in general the output of the $j^{th}$ memory in the $i^{th}$ bank can be expressed as $C_{ij}(X)$.

The output of the $i^{th}$ bank is then:

$$y_i = \sum_{j=i}^{Q} c_{ij}(X) \tag{1}$$

where Q is the number of memories per bank.

Let the target output vector when X is input be $T=[t_1 \ldots t_N]$. The mean square output error of the system can then be expressed as:

$$\overline{E^2} = \frac{1}{N} \sum_{i=1}^{N} (y_i - t_i)^2 \tag{2}$$

Substituting (1) into (2) gives an expression for the mean square error in terms of the contents of the memories:

$$\overline{E^2} = \frac{1}{N} \sum_{i=1}^{N} \left\{ \sum_{j=1}^{Q} C_{ij}(X) - t_i \right\}^2 \tag{3}$$

Equation 3 shows that the highest power term involving $C_{ij}(X)$ in the expression for mean square error is two. This indicates a single minimum, quadratic surface, and so convergence to a global optimum is guaranteed using a gradient algorithm.

The gradient descent algorithm operates on the currently addressed memory contents such that:

$$C_{ij}^{n+1}(X) = C_{ij}^n(X) + k \cdot \frac{\partial \overline{E^2}}{\partial C_{ij}^n(X)} \tag{4}$$

where $k(k \leq 1)$ is a constant determining the rate of convergence.

The gradient term required in (4) is simply calculated from (3) as:

$$\frac{\Delta \overline{E^2}}{\Delta C_{ij}^n(X)} = 2 \cdot (y_i - t_i) = 2e_i$$

where $e_i$ is the difference between the output of the $i^{th}$ bank and its target value. So, the algorithm for modifying the contents becomes:

$$C_{ij}^{n+1}(X) = C_{ij}^n(X) + 2k \cdot (y_i - t_i) \tag{5}$$

If a sufficiently large number of training patterns is available, a single exposure to each may be sufficient. In practice, however, it will usually be necessary to expose the system repeatedly to the training set, until convergence to a desired level of error is obtained. It may be found advantageous to vary, in successive passes, the order in which the training patterns are presented.

What is claimed is:

1. A pattern recognition apparatus comprising:
   an input port for receiving a set of input digital signal values representing a pattern of physical occurrences distributed over time or space to be recognized;
   means for encoding the input digital signal values into coded input signal values to form a digital representation of the received set of input digital signal values;
   a plurality of addressable digital signal storage memory devices each having at least one address line for addressing locations therein, the address lines being connected to receive bits from said digital representation; and
   means connected to receive digital data signals from said memory devices for producing a composite digital output signal dependent on data signals read from the addressed locations of the memory devices;
   wherein the means for encoding employs a redundant code having a normalized coded input signal value Hamming distance to normalized input signal value distance relationship with a mean slope greater than 1 for input signal value distances up to a predetermined level of at least 10% of the maximum input signal value distance.

2. An apparatus according to claim 1, in which said means for encoding is constructed to cause said slope to be at least 1.5.

3. An apparatus according to claim 2, in which said means for encoding is constructed to cause said slope to be at least 2.

4. An apparatus according to claim 1 in which said means for encoding is constructed to cause said predetermined level to be 15%.

5. An apparatus according to claim 1 in which said means for encoding is constructed to cause said predetermined level to be 20%.

6. An apparatus according to claim 1 in which said means for encoding is constructed to cause said predetermined level to be 25%.

7. An apparatus according to claim 1 in which said means for encoding is constructed to cause said code to employ a number of bits which is:
   i) greater than that which a binary code would require to represent an equal number of signal levels; and
   ii) less than that which a bar code would require to represent an equal number of signal levels;
   and has a higher monotonicity than would such a binary code.

8. A pattern recognition apparatus comprising:
   an input port for receiving a set of input digital signal values representing a pattern of physical occurrences distributed over time or space to be recognized;
   means for encoding the input digital signal values to form a digital representation of the received set of input digital signal values;
   a plurality of addressable digital signal storage memory devices each having at least one address line for addressing locations therein, the address lines being connected to receive bits from said digital representation; and
   means connected to receive digital data signals from said memory devices for producing a composite digital output signal dependent on data signals read from the addressed locations of the memory devices;
   wherein the means for encoding uses a code employing a number of bits which is:

i) greater than that which a binary code would require to represent an equal number of signal levels; and ii) less than that which a bar code would require to represent an equal number of signal levels;

and being selected to have a higher monotonicity than would such a binary code.

9. An apparatus according to claim 7, in which the means for encoding is constructed to cause said monotonicity to be at least 1.5 times that of a binary code.

10. An apparatus according to claim 9, in which the means for encoding is constructed to cause said monotonicity to be at least twice that of a binary code.

11. An apparatus according to claim 8, in which the means for producing a composite output signal comprises a plurality of digital signal combining circuits, each connected to receive digital data signals from a different plurality of the said memory devices, and each being arranged to produce a scalar valued signal output in dependence upon the data signals read from the addressed locations of those memory devices to which it is connected, the composite output signal being a vector including said scalar valued signal outputs.

12. A method of training a pattern recognition device which is arranged to receive a set of digital input signal values representing a pattern of physical occurrences distributed over time or space to be recognized comprising the steps of:

encoding said digital input signal values into coded input signal values to form a digital signal representation of said pattern using a redundant code which has a normalized Hamming distance to normalized input signal value distance relationship with a mean slope greater than 1 for input signal value distances up to a predetermined level of at least 10% of the maximum input signal value distance; and using the coded input signal values to recognize the pattern of physical occurrences.

13. A method of training a pattern recognition device which is arranged to receive a set of digital input signal values representing a pattern of physical occurrences distributed over time or space to be recognized comprising the steps of:

encoding said digital input signal values using a code employing a number of bits which is:
i) greater than that which a binary code would require to represent an equal number of signal levels; and
ii) less than that which a bar code would require to represent an equal number of signal levels;
and being selected to have a higher monotonicity than would such a binary code; and using the coded input signal values to recognize the pattern of physical occurrences.

14. A pattern recognition apparatus comprising:

an input port for receiving a set of digital input signal values representing a pattern of physical occurrences distributed over time or space to be recognized;

means for encoding the digital input signal values into coded input signal values to form a digital representation of the received set of input digital signal values;

a plurality of addressable digital signal storage memory devices each having at least one address line for addressing locations therein, the address lines being connected to receive bits from said digital representation; and means connected to receive digital data signals from said memory devices for producing a composite digital output signal dependent on data signals read from the addressed locations of the memory devices;

wherein the means for encoding employs a redundant code which has a normalized coded input signal value Hamming distance to normalized input signal value distance relationship having a mean slope greater than 2 for input signal value distances up to a predetermined level of at least 20% of the maximum input signal value distance.

15. An apparatus according to claim 14 in which the predetermined level is 25%.

16. An apparatus according to claim 14 in which the code employs a number of bits which is:
i) greater than that which a binary code would require to represent an equal number of signal levels; and
ii) less than that which a bar code would require to represent an equal number of signal levels;
and has a monotonicity at least 1.5 times that of a binary code.

17. An apparatus according to claim 14 in which the means for producing a composite output signal comprise a plurality of digital signal combining circuits, each connected to receive data signals output from a different plurality of said memory devices and each being arranged to produce a scalar valued signal output in dependence upon the data signals read from the addressed locations of those memory devices to which it is connected, the composite output signal being a vector including said scalar valued signal outputs.

18. A pattern recognition apparatus comprising:

an input port for receiving a set of input digital signal values representing a pattern of physical occurrences distributed over time or space to be recognized;

means for encoding the input digital signal values into coded input signal values to form a digital representation of the received set of input digital signal values;

a plurality of addressable digital signal storage memory devices each having at least one address line for addressing locations therein, the address lines being connected to receive bits from said digital representation; and means connected to receive digital data signals from said memory devices for producing a composite digital output signal dependent on data signals read from the addressed locations of the memory devices;

wherein the means for encoding uses a code employing a number of bits which is:
i) greater than that which a binary code would require to represent an equal number of signal levels; and
ii) less than that which a bar code would require to represent an equal number of signal levels;
and being selected to have a monotonicity at least 1.5 times that of a binary code.

19. An apparatus according to claim 18 in which said monotonicity is at least twice that of a binary code.

20. An apparatus according to claim 18 in which the means for producing a composite output signal comprise a plurality of digital signal combining circuits, each connected to receive data signals output from a different plurality of said memory devices and each being arranged to produce a scalar valued signal output in dependence upon the data signals read from the addressed locations of those memory devices to which it is connected, the composite output signal being a vector including said scalar valued signal outputs.

21. A method of training a pattern recognition device which is arranged to receive a set of digital input signal values representing a pattern of physical occurrences distributed over time or space to be recognized comprising the steps of:

encoding said digital input signal values into coded input signal values to form a digital signal representation of said pattern employing a redundant code which has a normalized coded input signal values Hamming distance to normalized input signal value distance relationship having a mean slope greater than 2 for input signal value distances up to a predetermined level of at least 20% of the maximum input signal value distance; and using the coded input signal values to recognize the pattern of physical occurrences.

22. A method of training a pattern recognition device which is arranged to receive a set of digital input signal values representing a pattern of physical occurrences distributed over time or space to be recognized comprising the steps of:

encoding said digital input signal values by employing a number of bits which is:
  i) greater than that which a binary code would require to represent an equal number of signal levels; and
  ii) less than that which a bar code would require to represent an equal number of signal levels;
and being selected to have a monotonicity at least 1.5 times that of a binary code; and using the coded input signal values to recognize the pattern of physical occurrences.

* * * * *